Aug. 21, 1923.
J. B. HOWE
1,465,670
CLUTCH BRAKE FOR CARD FEEDERS
Filed July 26, 1922
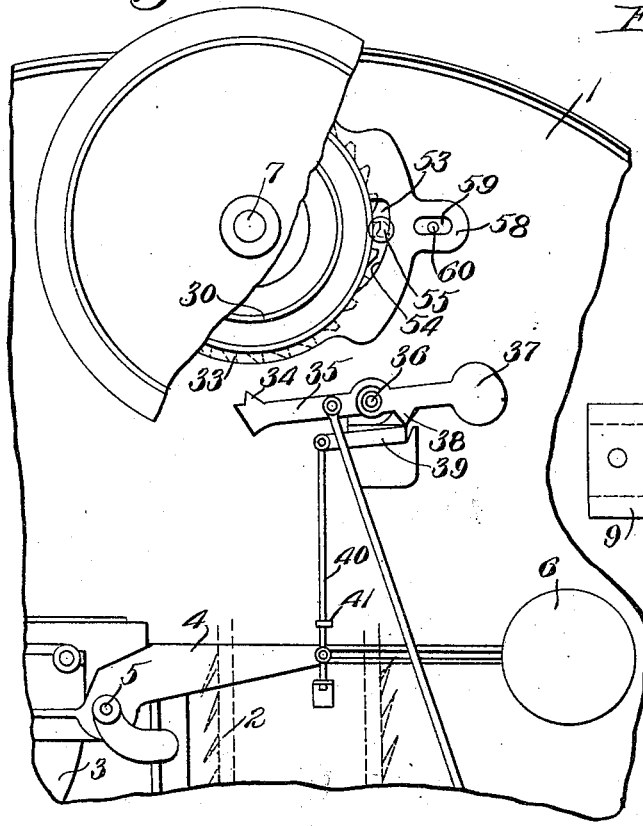
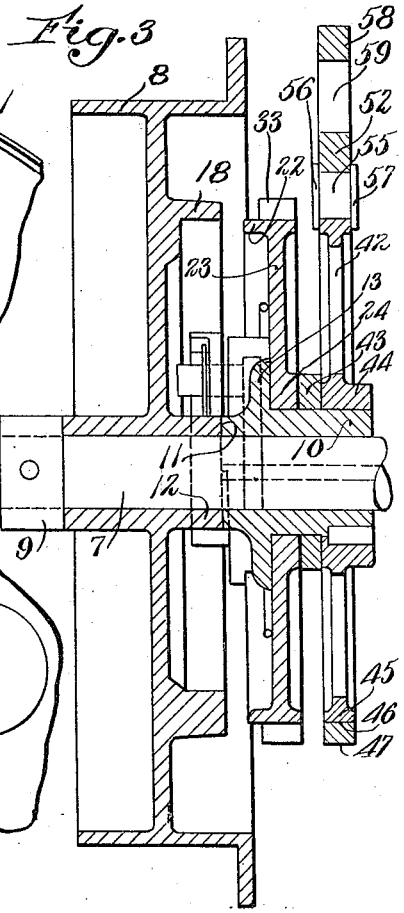
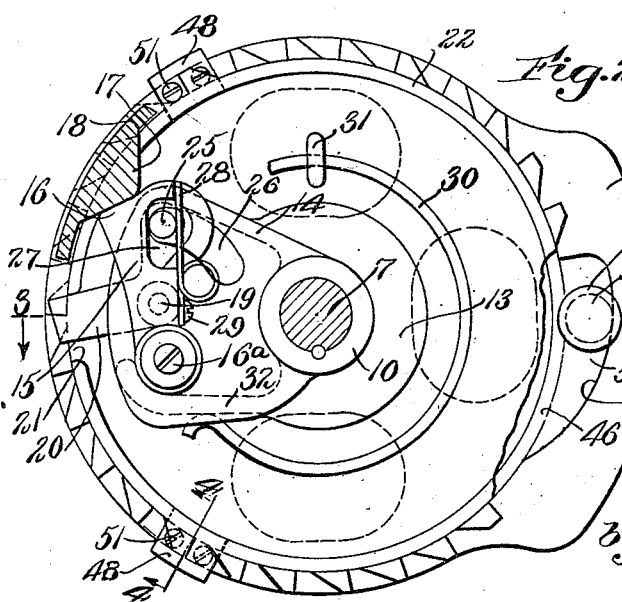
Inventor:
Joseph B. Howe,
by Roberts, Roberts & Cushman
Attys.

Patented Aug. 21, 1923.

1,465,670

UNITED STATES PATENT OFFICE.

JOSEPH B. HOWE, OF WORCESTER, MASSACHUSETTS, ASSIGNOR TO GEORGE S. HARWOOD & SON, OF BOSTON, MASSACHUSETTS, A COPARTNERSHIP CONSISTING OF SYDNEY HARWOOD AND JOHN H. HARWOOD.

CLUTCH BRAKE FOR CARD FEEDERS.

Application filed July 26, 1922. Serial No. 577,570.

*To all whom it may concern:*

Be it known that I, JOSEPH B. HOWE, citizen of the United States of America, and resident of Worcester, in the county of Worcester and State of Massachusetts, have invented new and useful Improvements in Clutch Brakes for Card Feeders, of which the following is a specification.

This invention concerns clutch mechanism such as is employed in carding feeders for imparting movement intermittently to the spike apron and associated parts. Mechanism of this general type is disclosed in my Patent 998,003 July 13, 1911, as well as in my co-pending application, Serial No. 430,568 filed December 13, 1920, (issued as Patent No. 1,424,165, August 1, 1922), of which latter this application is a continuation in part, the present invention relating to specific improvements in brake means useful for preventing the reversal of the driven parts upon disengagement of the clutch elements.

The principal object of the invention is to provide a simple, reliable and noiseless brake device for automatically preventing reversal of the driven parts when the drive clutch elements are disengaged and of such character that when associated with a clutch of the general type referred to, the action of the brake will not cause the clutch elements to bind or become locked together in stopping in such manner as to prevent their ready release.

In the accompanying drawings there is illustrated by way of example an arrangement of parts well adapted for attaining the above object.

Fig. 1 is a fragmentary side elevation of the upper part of a carding feeder of the type shown in the patent to Bramwell No. 216,373 June 10, 1879, having the devices of the present invention appended thereto, certain parts being broken away for clearness in illustration;

Fig. 2 is a side elevation to larger scale of a clutch such as disclosed in the patent to Howe, above referred to, provided with a brake constructed in accordance with the present invention, certain parts being in section and certain parts being broken away;

Fig. 3 is a cross section on line 3—3 of Fig. 2; the view being arranged vertically for convenience in illustration, and;

Fig. 4 is a fragmentary cross section on the line 4—4 of Fig. 2.

The numeral 1 indicates the upper part of the frame of a card feeding mechanism of the type above referred to, such feed mechanism comprising a spike apron 2 by means of which fibre is lifted for delivery to the scale pan 3. The scale pan is mounted upon a scale beam 4 fulcrumed at 5, and having a counter-balance at 6. The machine is provided with a transverse drive shaft 7 having suitable means for transmitting movement to the spike apron, such shaft extending outwardly through the frame member 1, and having the drive pulley 8 mounted upon its outer extremity. A collar 9 may be secured to the end of the shaft to retain the pulley in proper position.

A sleeve 10 is keyed to the shaft, such sleeve terminating at the point 11, and forming an abutment for the rear end of the hub 12 of the pulley. The sleeve 10 is provided with a radial flange 13 from which a sector member 14 (Fig. 2) projects. A dog 15 is pivoted at the point 16ª to the sector 14, such dog being provided with an ear 16 adjacent to its free extremity. This ear normally lies in the path of movement of lugs such as 17 projecting inwardly from an annular flange 18 carried by the pulley 8, such lugs, by engagement with the ear 16, serving to impart movement to the sector 14 and the shaft 7. An actuator lever is pivoted at the point 19 to the rear side of the sector 14, such lever having an arm 20 which projects through an opening 21 in the flange 22 of a clutch disengaging wheel 23, such wheel having a hub portion 24 journalled upon the sleeve 10 immediately to the rear of the flange 13. The actuator lever has a second arm provided with a pin 25 which projects forwardly and through a slot 26 in the sector 14, and also through an opening 27 in the dog 15. A spring 28 is secured at the point 29 to the dog 15 and normally bears against the pin 25. A spring 30 is secured to a lug 31 projecting from the front face of the wheel 23, such spring bearing at its free extremity against a rib 32 projecting from the sector 14.

The wheel 23 is provided with a series of teeth or lugs 33 projecting from its peripheral surface, such teeth lying in the vertical plane of a stop tooth 34 carried by a lever 35 pivoted at 36 upon the frame of the machine and having a counter-weight 37 at the end opposite the tooth 34. The counter-weight normally tends to swing the lever 35 in such manner as to engage the tooth 34 with one of the teeth 33 of the wheel 23. For holding the lever 35 in inoperative position, as shown in Fig. 1, the weighted end thereof is furnished with a projection 38 normally resting upon a trip lever 39 to which a link 40 is connected. The link is provided with a projection 41 so positioned that upon tipping of the scale beam under a load, the trip device 39 will be moved, permitting the weighted end of the lever 35 to drop, bringing the tooth 34 into engagement with one of the teeth of the wheel 23 and stopping the latter, thereby as fully described in the patent to Howe No. 998,003, July 18, 1911, causing the ear 16 of the dog 15 to be retracted, and disconnecting the shaft 7 from the drive pulley 8.

A brake wheel or disc 42 is secured to the rear portion of the sleeve 10, a collar 43 preferably being arranged between the hub 44 of such brake wheel and the hub 24 of the wheel 23. The brake wheel or disc 42 is provided with a rim portion 45 having a substantially smooth peripheral surface 46. A ring 47 encircles the rim 45, being arranged to turn freely thereon. At spaced points, clips 48 are provided for holding the ring 47 in operative position, each clip comprising spaced side members 49 and 50, which embrace the ring 47 and overlap the sides of the rim 45. These clips may be held in position by means of screws 51 engaging the ring 47.

The ring 47 is widened at one side, as indicated at 52 to provide a housing having a recess 53 of which the inner wall is formed by the surface 46 of the rim of the wheel or disc 42, while its outer wall consists of the eccentrically curved cam face 54 of the housing. Within this recess a roller 55 is arranged, such roller having the end flanges 56, 57, which overlap the sides of the housing 52, thus retaining the roller in proper position and at the same time serving as additional means for securing the ring 47, with the housing 52, in proper relative position to the rim 45. The housing 52 is provided with an outstanding ear 58 having an elongate slot 59 into which a pin 60 projects. This pin is secured to the frame of the machine, and is of a diameter somewhat smaller than the width of the slot 59.

When the lever 35 is tripped to bring the tooth 34 into engagement with a tooth of the stop wheel 23, the driving clutch elements are disengaged, thus permitting the pulley 8 to rotate freely while the shaft 7 comes to rest. As the upcoming side of the spike apron is normally loaded with fibre, there is a tendency for the shaft 7 to rotate in a reverse direction after the disengagement of the clutch elements, and to avoid such reverse rotation, the roller brake device above described is provided, the engagement of the roller 55 with the peripheral surface 46 of the brake wheel or disc 42 and with the cam surface 54 of the housing 52 serving to prevent any reverse rotation of the wheel 42 and the shaft 7. This roller clutch brake acts almost instantaneously and is much quieter in action than a brake mechanism employing a pawl and ratchet.

When a drive clutch such as is described in the patent referred to is employed, it is found that the dog 15 may at times be moved inwardly until it strikes the hub of the drive pulley, thereby in effect linking the wheel 23 to the shaft, and further that the momentum of the clutch and brake parts carried by the shaft apparently imparts a slight twist to the end of the shaft as the latter comes to rest, thereby permitting the brake element whether of the pawl or roller type to secure a hold somewhat in advance of the point which would normally be possible if such twist did take place. This puts a great strain upon the tooth 34 of the stopping lever 35, such tooth being called upon to sustain the torsional strain of the shaft, and making it exceedingly difficult to disengage the tooth 34 from the tooth of the wheel 23 with which it may contact. In order to avoid such action, the slot 59 and the pin 60 are herein provided. In the normal position of the parts, the friction between the rim 45 and the ring 47 serves to hold the housing 52 in the position shown in Fig. 2, with the pin 60 engaging the lower side of the slot 59. When the clutch is disengaged and the shaft comes to rest with the roller 55 engaging the cam surface 54, the ring 47 with the housing 52 is permitted to move rearwardly to a slight extent as permitted by the width of the slot 59 until the pin 60 engages the upper surface of such slot. Such movement is however sufficient to relieve the torsional strain imparted to the shaft, thus removing any excessive pressure between the tooth 34 and the tooth 33 with which it engages.

The operation of the device is substantially as follows, it being understood that the parts normally occupy a position substantially such as shown in Fig. 2. In this position one of the lugs 17 of the pulley 8 engages the ear 16 of the dog 15 and turns the sector 14 together with the shaft 7 in a counter-clockwise direction as viewed in Fig. 2. During the normal operation the wheel 23 rotates with the pulley 8 by reason of the reaction of the spring 30.

When the scale beam tips and releases the lever 35, the tooth 34 engages one of the teeth 33 of the wheel 23 thus stopping the wheel 23. As the shaft 7 continues to rotate, the dog 15 is moved bodily with respect to the stationary wheel 23 so that the outstanding arm 20 of the actuator lever engages the edge of the slot 21 in the flange 22 thereby turning the arm 20 in a clockwise direction and swinging the pin 25 against the spring 28. The spring 28 is thus compressed until the pin 25 strikes the edge of the opening 27 in the dog 15 whereupon the dog is swung in a clockwise direction to disengage the ear 16 from the driving lug 17. During the relative movement of the wheel 23 and sector 14, the spring 30 is compressed.

As soon as the parts 16 and 17 are disengaged the spring 28 snaps the dog 15 to the right as viewed in Fig. 2 so as to clear it completely from the lugs 17. The pulley 8 now continues to rotate without driving the shaft 7 and the brake device brings the shaft 7 to rest in the manner above described.

When the tooth 34 is released from the tooth 33 of wheel 23, the spring 30 which has been placed under compression in the stopping operation turns the wheel 23 sufficiently to project the arm 20 outwardly through the slot 21 and as it is thus moved outwardly through the slot its engagement with the edge of the slot serves to turn the dog 15 in such manner as to bring its ear 16 again into the path of the driving lug 17 whereupon turning of the shaft 7 is resumed.

While as herein shown, the brake device is particularly well adapted for use with a clutch such as shown in the patent to Howe referred to, it is also applicable to clutches of other types such for example as shown in my Patent No. 1,424,165, August 1, 1922 and it is contemplated that it may be applied to such clutch or to other forms of clutch as may be found desirable.

I claim:

1. A reverse preventing device for preventing reverse rotation of a clutch driven shaft, comprising in combination a housing, means supporting said housing for limited movement, a friction brake element carried by said housing, and a drive member fixedly secured to said shaft and having its peripheral surface arranged for engagement by said brake element.

2. A reverse preventing device for use in a card feeder having a clutch driven shaft, comprising a housing mounted to turn freely about the axis of the shaft, means for limiting such movement of the housing, a roller brake element retained in position by said housing, and a member secured to the shaft and having a surface for engagement by said brake element.

3. A reverse preventing device for use in a machine of the class described having a clutch driven shaft, comprising a disc-like member secured to the shaft, and a brake roller co-operable with the rim of said disc-like member for preventing reverse rotation of the shaft.

4. A reverse preventing device for use in a textile machine having fibre manipulating means and a clutch controlled shaft for driving said means, comprising a wheel fixed to the shaft, a member having a surface eccentric to the rim of the wheel and spaced from the latter, and a roller interposed between the rim of the wheel and said eccentric surface, said wheel with said roller and eccentric surface constituting a friction brake operative to prevent reverse rotation of the driving shaft.

5. A reverse preventing device for preventing reversal of a driven shaft in stopping, comprising a wheel secured to the shaft, a housing concentric with the wheel and rotatable freely about the axis of the shaft, said housing having an opening therein provided with an eccentric wall, and a roller arranged within said opening and bearing against the rim of the wheel, said roller having flanges overlying opposite sides of the wheel rim.

6. A reverse preventing device for a clutch driven shaft comprising a disc secured to the shaft, a ring-like member encircling said disc and turning freely thereon, said ring-like member having a recess in its inner edge having an eccentric outer wall, a roller within said recess interposed between the edge of the disc and the eccentric wall of the recess, and means for limiting turning movement of the ring member.

7. A reverse preventing device for preventing reversal of a driven shaft, comprising a housing mounted for free oscillation about the axis of the shaft, said housing having an elongate radial slot therein, a fixed pin engaging said slot, said pin being of a diameter less than the width of the slot, brake elements supported by the housing, and a member fixed to the shaft and having a surface co-operable with said brake elements in preventing reverse rotation of the shaft.

8. A reverse preventing device for a clutch driven shaft comprising a disc secured to the shaft, a ring-like member concentric with and turning freely upon said disc, means for retaining said member in operative relationship to the disc, said member having a recess provided with a wall eccentric to the edge of the disc, a roller within the recess bearing upon the edge of the disc, a lug projecting from said ring and having a radial slot therein, and a fixed pin of a diameter less than the width of the slot and engaging the latter whereby to limit turning of the ring.

9. A reverse preventing device for preventing reversal of a shaft driven by means of a driving clutch having a driving dog and a stopping dog, comprising a movable element engageable with a shaft carried part normally to prevent substantial reversal of the shaft after disengagement of the driving dog, and means constructed and arranged to permit a reverse movement of the shaft of small angular extent at the instant of stopping whereby to avoid locking of the stopping dog under torsional strain of the shaft.

10. A reverse preventing device for preventing reversal of a shaft driven by means of a clutch having a stopping dog, comprising a disc fixed to the shaft, a ring encircling said disc and having an element providing an eccentrically disposed surface, a roller interposed between said surface and the edge of the disc, and means limiting turning movement of the ring to an angular extent sufficient to avoid locking of the stopping dog under torsional strain of the shaft in stopping.

Signed by me at Boston, Mass., this 19th day of July, 1922.

JOSEPH B. HOWE.